B. A. KNOWLES.
TEAT CUP FOR MILKING MACHINES.
APPLICATION FILED JUNE 19, 1920.
1,378,683.
Patented May 17, 1921.
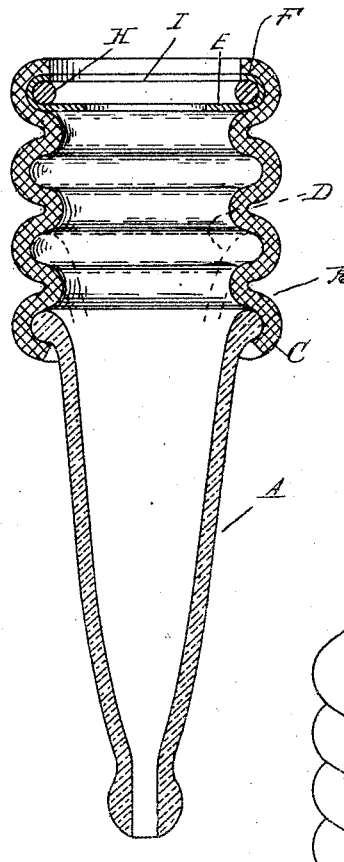
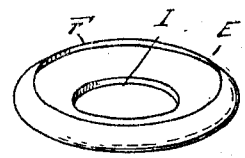
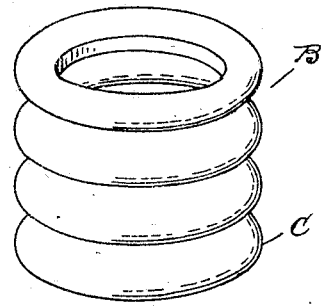
Inventor
Bernard A. Knowles
By Whittemore Hulbert & Whittemore
Attorneys

UNITED STATES PATENT OFFICE.

BERNARD A. KNOWLES, OF AZALIA, MICHIGAN.

TEAT-CUP FOR MILKING-MACHINES.

1,378,683.

Specification of Letters Patent.　Patented May 17, 1921.

Application filed June 19, 1920. Serial No. 390,145.

*To all whom it may concern:*

Be it known that I, BERNARD A. KNOWLES, a citizen of the United States of America, residing at Azalia, in the county of Monroe and State of Michigan, have invented certain new and useful Improvements in Teat-Cups for Milking-Machines, of which the following is a specification, reference being had therein to the accompanying drawings.

The invention relates to teat cups for milking machines and in some of its features is an improvement on my former Patent No. 1,333,261 of March 9, 1920. The invention also comprises various features of construction as hereinafter set forth.

In the drawings.

Figure 1 is a central longitudinal section;

Fig. 2 is a perspective view of the collapsible chamber;

Fig. 3 is a similar view of the sealing diaphragm.

My former patent, above referred to, consisted essentially in a tapering tubular body, preferably formed of glass, for receiving and supporting the teat and above this body a collapsible chamber, which during the pulsating air pressure is alternately contracted and elongated, to effect the discharge of the milk. My present construction also embodies the same general features and as shown, A is the tapering tubular body, preferably formed of glass, and B is the collapsible chamber, preferably formed of rubber and secured to the body A so as to extend upward therefrom.

For use on teats of different size, different lengths of cup are required. With my present construction I provide means of adjustment by which the same sized cup may be adapted for different lengths of teat. This is accomplished by forming the collapsible member B with a series of grooves therein for engaging the bead C surrounding the upper end of the body A. When this bead is engaged with the end groove in the member B, the greatest length is obtained, while adjustment into one of the other grooves, as indicated in dotted lines at D, will shorten the cup. The formation of these grooves in the member B also facilitates the longitudinal collapsing movement thereof, the outer surface being conformed substantially to the inner surface and thereby producing a corrugated or bellows-like structure.

As it is necessary to prevent leakage of air in at the upper end, I have provided a sealing diaphragm and this is preferably of a construction which is engageable with one of the grooves in the member B. As shown in Figs. 1 and 3, the sealing diaphragm E is provided at its periphery with a return-bent portion F. Within the groove formed by the return-bent portion is an annular reinforcement H, which possesses sufficient rigidity to hold the periphery in sealing contact with the inner face of the groove in the member B. The diaphragm E is centrally apertured at I for the passage of the teat, this being sufficiently restricted in diameter to produce an effective seal.

In use, the members A, B and E are easily separated or assembled, which facilitates thorough cleansing of the parts. When assembled, the teat may be inserted through the diaphragm E and the device is ready for use. It will be understood that the pulsating air pressure is communicated through the tube (not shown), which is attached to the lower end of the body A and through which the milk is also discharged.

What I claim as my invention is:

1. The combination with a tubular rigid body for supporting the teat, of a member formed of flexible elastic material molded and disposed to permit collapse of the member longitudinally under atmospheric pressure, said member having a longitudinally adjustable engagement with the upper end of the rigid tubular body.

2. The combination with a rigid tubular body member for supporting the teat, of a longitudinally collapsible flexible extension at said body having a series of annular corrugations therein for alternative engagement with said body to vary the total length.

3. The combination with a rigid tubular body portion for supporting the teat, of a flexible member forming an extension at the upper end of said body, said flexible member having a series of annular corrugations therein, imparting flexibility thereto for longitudinal collapsing, and said corrugations also forming adjustable means of engagement with said rigid body to alter the total length thereof.

4. The combination with a rigid tubular body portion for supporting the teat, of a flexible extension provided with a series of annular corrugations, a bead on said body portion for alternative engagement with the several corrugations to alter the total length, a sealing diaphragm apertured for engagement with the teat and provided with a peripheral rigid reinforcement for sealing engagement with said extension.

In testimony whereof I affix my signature.

BERNARD A. KNOWLES.